US005604600A

United States Patent [19]
Webster

[11] Patent Number: 5,604,600
[45] Date of Patent: Feb. 18, 1997

[54] PRODUCTION TREES FOR GENERIC REPRESENTATION OF DOCUMENT REQUIREMENTS FOR PARTICULAR OUTPUT TERMINALS

[75] Inventor: Marc W. Webster, Rochester, N.Y.

[73] Assignee: Xerox Corporation, Stamford, Conn.

[21] Appl. No.: 568,073

[22] Filed: Dec. 6, 1995

[51] Int. Cl.$^6$ .......................... H04N 1/00; G03G 21/00; G01M 1/00; G06F 15/00
[52] U.S. Cl. .................. 358/296; 358/401; 364/551.01; 395/114; 399/1
[58] Field of Search .................................... 358/296, 300, 358/400, 401, 406, 407, 468; 395/114; 355/202; 364/131, 140, 148, 550, 551.01

[56] References Cited

U.S. PATENT DOCUMENTS 5,363,175  11/1994  Matysek .................................. 355/208
5,469,533  11/1995  Dennis .................................... 395/114

Primary Examiner—Eric Frahm
Attorney, Agent, or Firm—Ronald F. Chapuran

[57] ABSTRACT

An electronic image processing apparatus includes a controller and a plurality of resources in an arbitrary configuration. Each of the resources provides an associated processor storing data related to operational capabilities of the associated resource. The controller is adapted to dynamically configure the image processing apparatus to operate in accordance with the the operational capabilities of each of the processors by defining job requirements as a combination of images defining a set of sheets and specifying compilations of sheets. The job requirement is converted into an assembly tree relationship for merging into additional assembly trees for formulating the job requirement. The controller responds to the data related to the operational capabilities of each of the modules and to the the assembly tree relationship of images, copy sheets, and compilations of copy sheets for providing a production tree relationship of the operational capabilities of the modules including timing relationships for operating the image processing apparatus. The production tree relationship further permits arbitrary definition of a job requirement into a first segment independent of the capabilities of the modules and a second segment dependent upon selected capabilities of selected modules to allow the image processing apparatus to be partially configured based upon operator entered constraints. This technique further allows adaptive control of selective diagnostics.

21 Claims, 11 Drawing Sheets

PRODUCTION TREES FOR GENERIC REPRESENTATION OF DOCUMENT REQUIREMENTS FOR PARTICULAR OUTPUT TERMINALS

REFERENCE TO RELATED APPLICATIONS

The following U.S. Ser. Nos. are referenced: 567,819, 567,822, 568,165, and 567,978.

FIELD OF THE INVENTION

The present invention relates to a system for developing Document Output Terminals from autonomous machine modules with standard control, data communication and physical interfaces.

BACKGROUND OF THE INVENTION

Prior art includes U.S. Pat. No. 5,363,175, assigned to the same assignee as the present invention covering distributed job scheduling of modular components. Also pending U.S. Ser. No. 280,978 covers a controller interrogating processors for operational timing data for configuring the controller to operate in accordance with the operational timing of the processors.

Traditionally, representing and controlling a machine was based upon certain assumptions about the interconnection of the machine. In particular, the assumption was that a marker module was at the center, with feeders upstream and finishers downstream from the marker with the arrangement being essentially linear. Any deviations from this linear interconnection in the prior art were not possible, generally, without substantial redesign of hardware and software.

This type of product development usually began with a core machine, typically the marking engine, with modules tailored to work with the core machine. This approach produced tightly integrated machines composed of modules that were functionally interdependent. The products may have been physically modular (easily separable for transportation) but they were not easily reconfigured nor could they typically be used on other products without extensive revision of the control software. With this type of development, it was difficult to use modules with any product other than the product for which they were developed. In addition to the physical considerations, (for example, paper path heights, locations etc.) the modules generally have dependencies on other parts of the product such as user interfaces, schedulers, and paper path control.

For example, a machine module to staple a set of copy sheets was very specific to the machine hardware and software architecture. This meant that the set of copy sheets delivered to the stapler must be in a very well defined orientation and format. In this configuration, only one manner of stapling was accommodated. However, with various stapling machines available from various vendors, more information is needed from the various staplers to determine if a particular operation can be completed.

That is, one machine might receive the set face up, staple it, and deliver the set face down. Another machine might do the same but with the output face up, another machine might not take sets in but only separate sheets. Trying to describe all possible permutations using Document Printing Application (DPA) ISO 10175, styled key words quickly becomes unmanageable. Thus, there has been a need to create modules that are capable of stand alone operation and are insensitive to the neighboring modules.

As disclosed in pending applications U.S. Ser. No. 563,317, U.S. Ser. No. 563,873, U.S. Ser. No. 565,189, and U.S. Ser. No. 563,817 it is possible to provide a system that treats all modules uniformly, regardless of specific functions (such as feeding, finishing, and marking) and to provide open configurations, that is, the number and sequence of modules is not fixed or limited. It is also possible, as described in the above referenced applications, to provide each module with a generic, uniformly described identification that is conveyed to the controller and the controller in turn composes the descriptions into a single machine description. Thus, no matter the geometric configuration of the connected modules, the machine operates to complete a given job. The configuration of the modules, feeder, marker, or finisher is not pertinent. There might not even be a marker present for a machine to operate and complete a job. In other words, there need not necessarily be only one marker or there need not be any marker and there may be any number of feeders or finishers to complete a given job requirement. Referring to the above referenced applications, it is also possible to provide a system that treats various machine modules uniformly but with the appropriate constraints. In particular, it is possible to define modules as transducers to accomplish coordination by finding a sequence of transfers between the various transducer inputs and outputs that is consistent with the constraints.

To achieve modular uniformity and provide open configurations as discussed above, in particular, to define modules as transducers and coordinate modules by finding a sequence of transfers between transducer inputs and outputs that is consistent with constraints, there is a need to be able to represent job requirements or "documents" in a manner that accommodates this uniformity. It is an object of the present invention, therefore, to provide a representation of a job requirement or "document" that is machine independent and print ready. It is another object of the present invention to provide an assembly tree representation to describe a document in a universal manner rather than describing the document in terms of actions to be taken.

There is also the need, however, to be able to describe a document in a universal description and yet provide a plan for an arbitrary document output terminal to produce a particular job requirement or document. Once a job requirement has been expressed in a universal manner independent of specific modules to achieve the result, ultimately the document or job requirement must be produced by specified modules.

It is therefore another object of the present invention to be able to map a universal representation of a job requirement along with an output terminal expressed in terms of components with capabilities onto the output terminals capabilities. Still another object of the present invention is to be able to convert an assembly tree representation of a job requirement into a production tree whose nodes represent output terminal capabilities and edges represent transfers of images, sheets, and compilations. Another object of the present invention is to selectively provide partial or untimed production trees to specify certain output terminal actions or selected diagnostic routines. Still another object of the present invention is to be able to define a document with an assembly tree component and a partial production tree component. Other advantages of the present invention will become apparent as the following description proceeds, and the features characterizing the invention will be pointed out with particularity in the claims annexed to and forming a part of this specification.

SUMMARY OF THE INVENTION

According to the present invention, an electronic image processing apparatus is provided with a controller and a plurality of resources in an arbitrary configuration. Each of the resources includes an associated processor storing data related to operational capabilities of the associated resource. The controller is adapted to dynamically configure the image processing apparatus to operate in accordance with the operational capabilities of each of the processors and to define processing requirements as a combination of images defining a set of sheets and specifying compilations of sheets. The processing requirement is converted into an assembly tree relationship for merging into additional assembly trees for formulating the job requirement. The controller responds to the data related to the operational capabilities of each of the modules and to the the assembly tree relationship of images, copy sheets, and compilations of copy sheets for providing a production tree relationship of the operational capabilities of the modules including timing relationships for operating the image processing apparatus. The production tree relationship further permits arbitrary definition of a job requirement into a first segment independent of the capabilities of the modules and a second segment dependent upon selected capabilities of selected modules to allow the image processing apparatus to be partially configured based upon operator entered constraints. This technique further allows adaptive control of selective diagnostics.

DETAILED DESCRIPTION OF THE INVENTION

Figure 1:
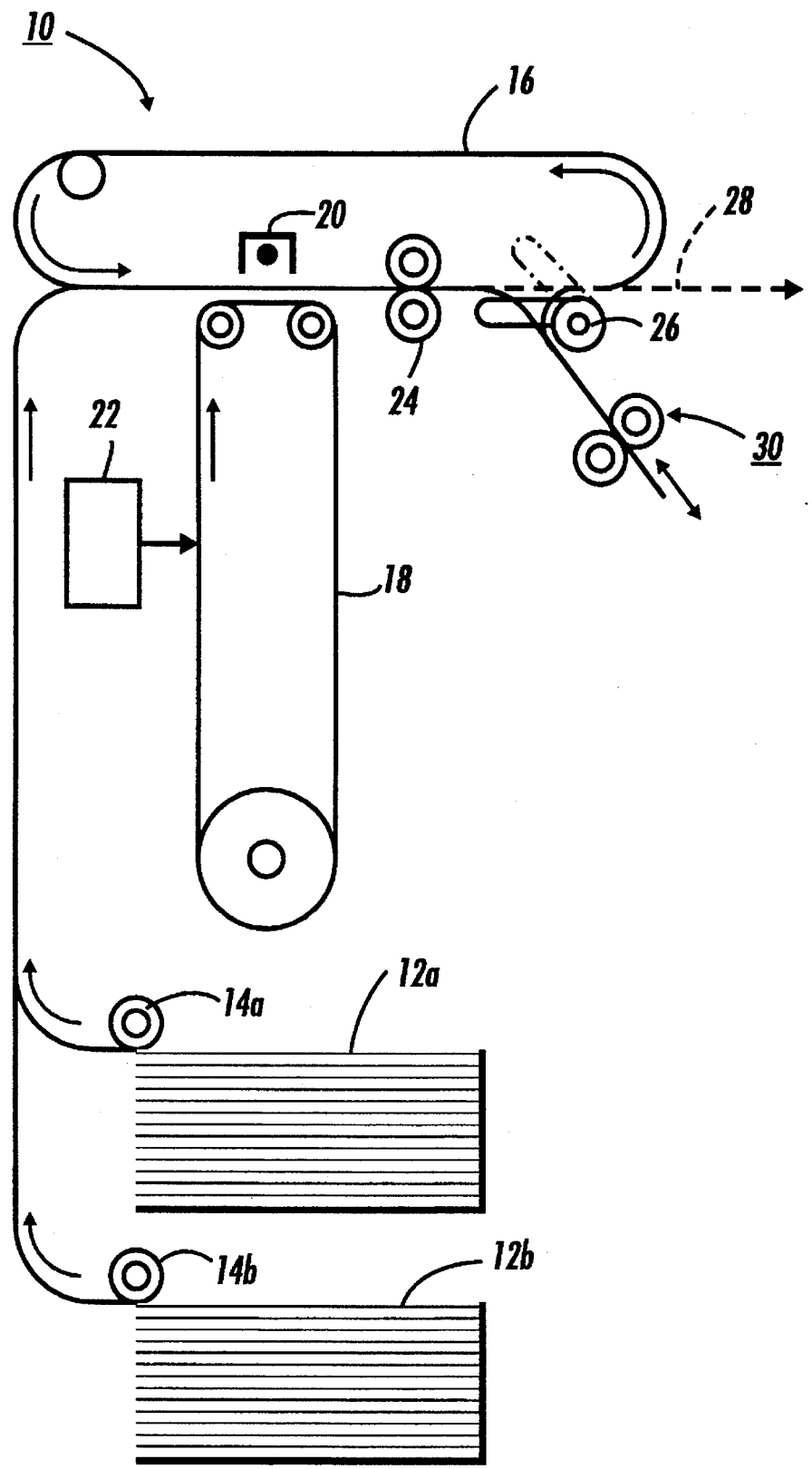
FIG. 1 is a simplified elevational view showing the relevant parts of a typical printing apparatus, on which the present invention may operate.

FIG. 1 is a simplified elevational view of the paper path of an on-demand printing apparatus, capable of simplex or duplex output, in which a stream of digital video signals representative of images desired to be printed causes the desired images to be formed on a selected side of a print sheet. The particular architecture shown in FIG. 1 is for an electrostatographic printer, but it will be understood that the principle of the invention could apply equally to other types of image-creation technologies, such as ink-jet printing. The printing apparatus, generally indicated as 10, contains one or more stacks of available sheets on which to print images, these stacks being indicated as 12a and 12b. The sheets of paper in the stacks 12a and 12b may differ in, for example, size, color, or the presence of a pre-printed letterhead. When it is desired to create an image on a sheet, a sheet of a desired type is drawn from a stack such as 12a or 12b, such as by respective feeders 14a, 14b, and the individual sheet is fed onto duplex loop 16.

Duplex loop 16 is typically in the form of an endless belt which is capable, by means of friction, static electricity, vacuum, or other means, of retaining a plurality of sheets thereon, thereby retaining a particular sheet until it is time for the sheet to receive an image on the side of the sheet facing outwardly from the belt of the duplex loop 16. In the architecture shown in FIG. 1, it is intended that sheets "ride" on the outer surface of the belt of duplex loop 16. Along one portion of duplex loop 16, the belt of duplex loop 16 comes into close contact with a photoreceptor belt indicated as 18. At the point of close proximity of duplex loop 16 and photoreceptor belt 18, there may be provided a transfer corotron 20, the function of which will be familiar to one skilled in the art of xerography.

In the xerographic-based embodiment of a printing apparatus shown in FIG. 1, a device which shall be here generally referred to as an "imager" creates an electrostatic latent image on the surface of photoreceptor 18. Imager 22 has the function of receiving a sequence of digital signals representative of the desired image to be printed, and outputs a physical manifestation, such as a modulated laser scanning beam, to imagewise discharge selected areas on the photoreceptor 18 to create an electrostatic latent image representative of the image desired to be printed. As is known in the art of electrophotography, other stations along the path of photoreceptor 18, such as a charging bar and development unit (not shown) are also required to create the desired developed image on the photoreceptor belt 18. This developed image, which is typically in the form of a reverse image in toner particles on the photoreceptor 18, is then made available to a sheet which rides on the outer surface of duplex loop 16.

After an image is created on the photoreceptor belt 18 by imager 22, and developed (by means not shown), the motion of photoreceptor belt 18 causes the developed toner image to be in close proximity or in contact with a sheet, originally from stack 12a or 12b, which is riding on the outer surface of duplex loop 16. At transfer corotron 20, the toner particles arranged in imagewise fashion on photoreceptor 18 are electrostatically transferred to the surface of the sheet by transfer corotron 20. Soon thereafter along the path of duplex loop 16, the toner image on the sheet is passed through a fuser 24, which causes the toner image to be fixed permanently on the outer surface of the sheet, in a manner known in the art. Thus, immediately downstream of fuser 24, there will be created a sheet having a desired image on the side thereof which faces outward along the duplex loop 16. If at this point the sheet having the image thereon is desired to be output from the system, a device such as router 26, a simple design of which is shown in FIG. 1, but which may be of any number of designs known in the art, will cause the sheet to be disengaged from the duplex loop 16 and output from the printer such as through the path indicated by arrow 28. This output sheet can either be directly output into a tray for pickup by the user, or may be sent to a sorting or stapling device according to the larger architecture of the printing apparatus.

It will be noted that the specifically electrostatographic aspects of the apparatus shown in FIG. 1, such as the photoreceptor 18, imager 22, and transfer corotron 20, could be replaced by equivalent apparatus for other techniques for creating images on one side of a sheet, such as an ink-jet printhead. Also, imager 22 as here described assumes that the user has unlimited control over the order of page images (the "digital video") being output through imager 22. If, however, the original source of images to be created is itself a set of automatically fed hard-copy images, i.e. if the printing system as a whole is operating as a copier, the feeding of originals will also create certain constraints on the optimal order of images created with the printer. It is probably preferable to digitize (convert to digital signals) the original hard-copy images, electronically store the resulting data, and apply the data as required to a digitally-based imager 22

Figure 2:
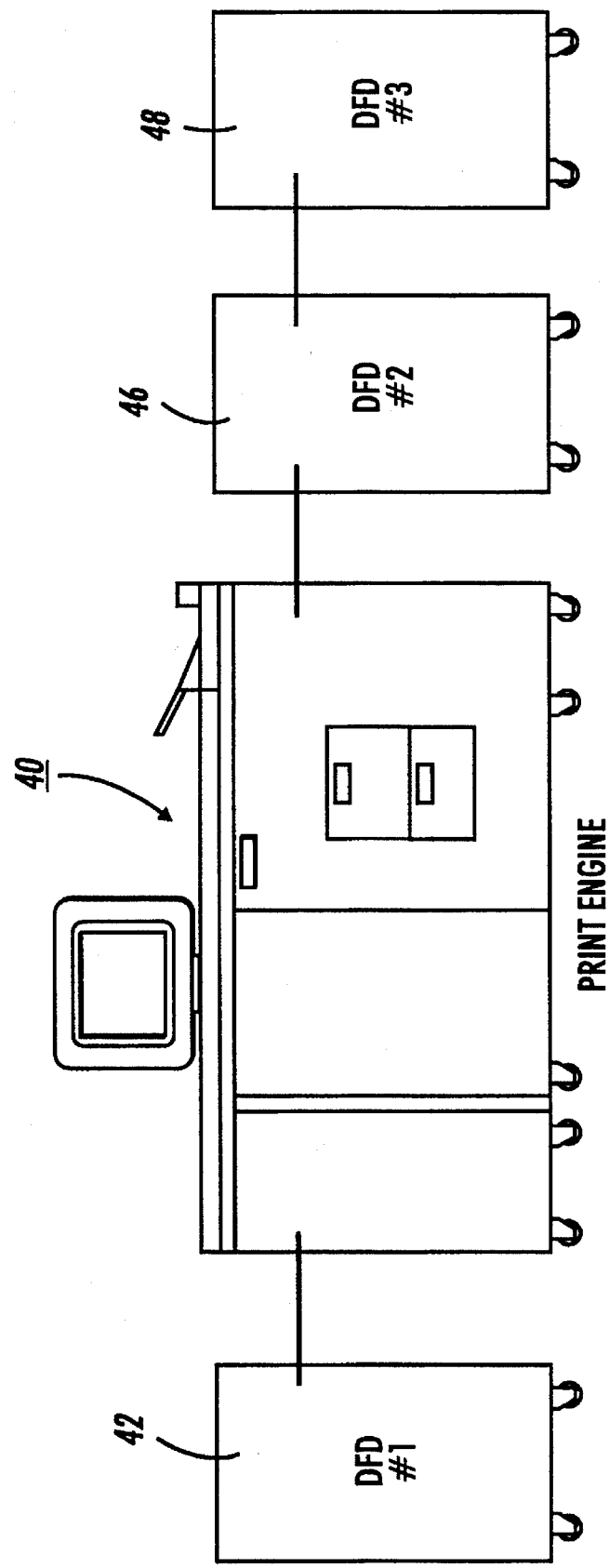
FIG. 2 is a systems diagram showing a typical prior art machine configuration.

Referring to FIG. 2, there is shown a standard prior art interface provided by a printer to attach feeding and/or finishing devices. In particular, marking engine or printer 40 including a user interface with a screen is interconnected to document feeding device 42 and document finishing devices 46 and 48. As is well known, the feeding devices are sources of printable media like paper for providing printer 40 with stock for completion of the printing process. The finishing devices can be any suitable devices such as sorters, compilers, staplers, folders, or trimmers. Feeding devices are paper trays, and the need for feeding devices is to supply an increased level of printable stock selection to the printer.

The feeding/finishing devices are physically attached to the print engine such that sheets can be feed into the print engine or sheet or sets can be transferred from the print engine to the devices. The devices are attached to each other such that sheets or sets of paper can be transferred from one device to another.

Figure 4:
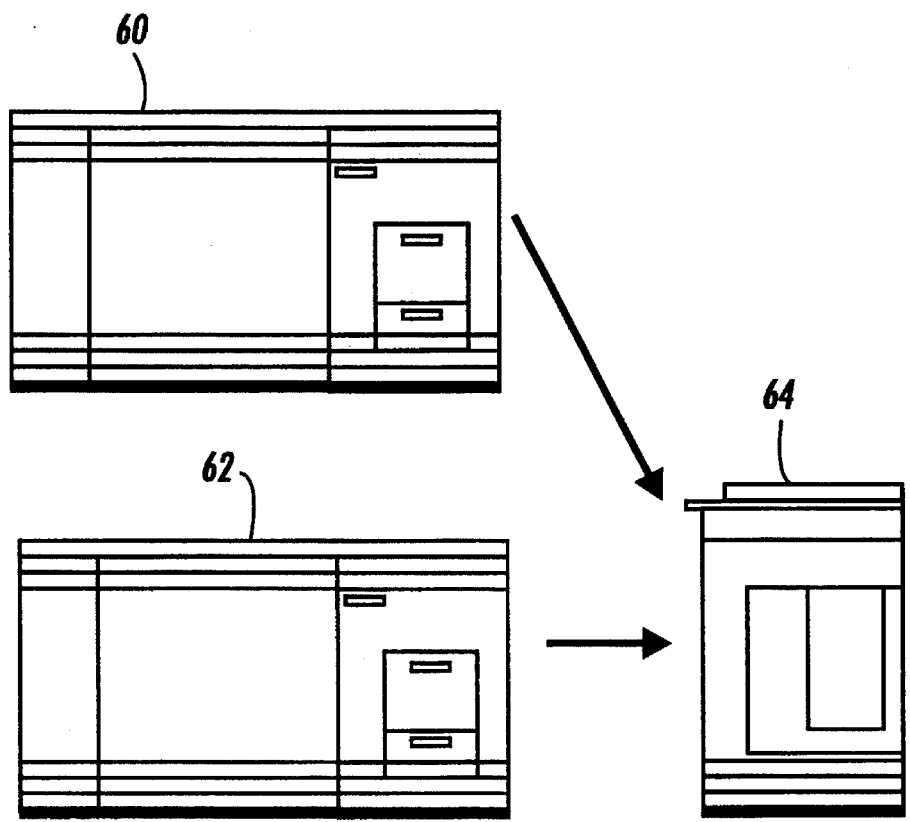
Figure 5:
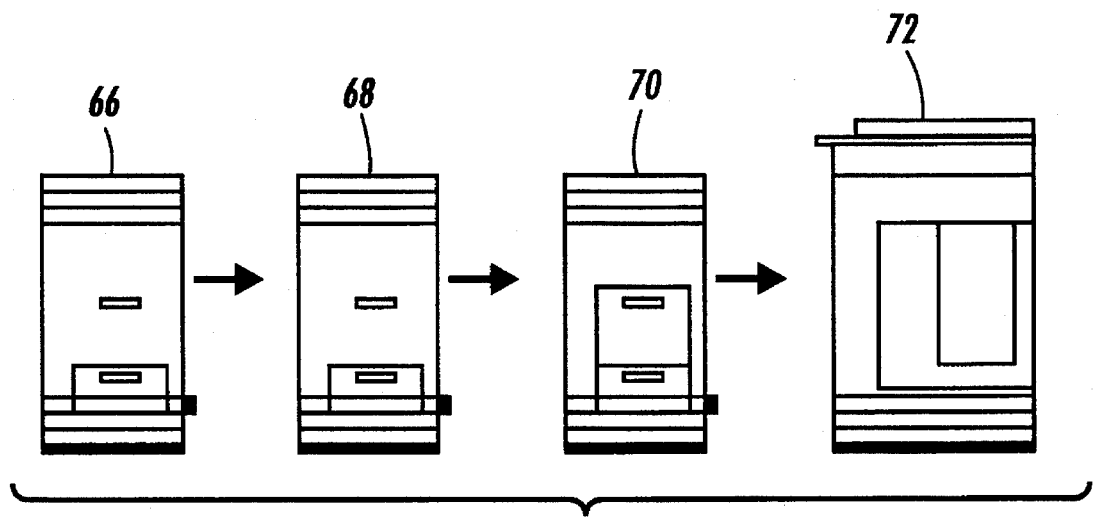

Prior art devices are generally in a linear relationship having one print engine with sheet feeder or internal trays up stream and a finisher station downstream as shown in FIG. 2. A need exists to create modules that are capable of standalone operation and are not control dependent to their neighboring modules. The solution is developing autonomous machine modules with standard control, data communication, and physical interfaces, such that each module is indifferent to its neighbor and all modules can be modeled using common techniques. Document Output Terminals would be created by integrating collections of physical machine modules. A machine module is standalone, and makes no assumptions about any other machine module, to enable a liberal mix-and-match of modules. An important aspect of this approach is that all machine modules of a Document Output Terminal (DOT), whether finishers, markers, or finishers are treated identically, allowing nontraditional configurations such as feeders post-marking, tandem markers in series or parallel, feeders and finishers only with no marker, etc. as illustrated in FIGS. 3, 4, and 5.

Figure 3:
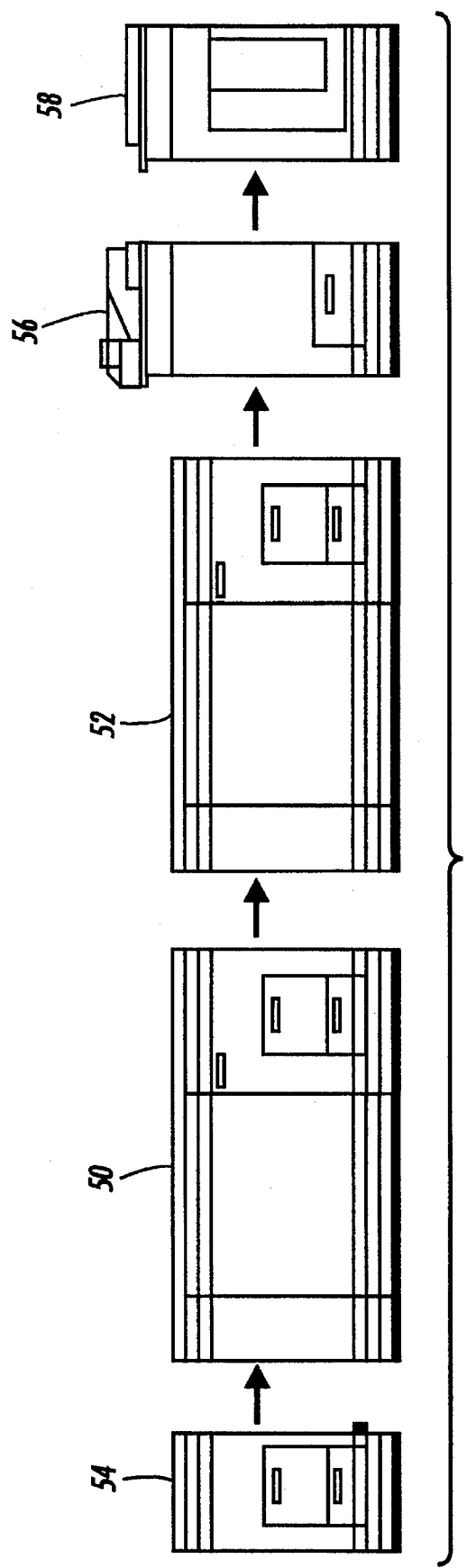
FIGS. 3, 4, and 5 illustrate arbitrary machine configurations capable of transparent control in accordance with the present invention.

For example, FIG. 3 shows the two markers 50, 52 in series with one feeder 54 and two finishers 56, 58. FIG. 4 illustrates markers 60, 62 in parallel with finisher 64 and no feeder module. FIG. 5 illustrates a configuration of 3 feeders 66, 68, and 70 connected to finisher 72 and no marker module in the configurations. The only constraints on configurations is that the inputs and outputs of the machine modules must match (i.e. can't connect a module that outputs sets to a module that only inputs sheets).

Since machine modules or facilities can be configured into arbitrary configurations, a small number of modules can yield a large number of configurations, each able to meet different needs of customers. For example, a suite of ten modules might be used to create fifty different configurations to meet fifty different types of customer needs. Using autonomous machine modules, this is reasonable; without autonomous machine modules it would be much more difficult to address to many different kinds of needs. Once a suite of machine modules has been developed, creating a new machine for a particular customer need can be orders of magnitude faster. In the ideal case, one simply selects which machine modules and how many of each are required, and ships them to the customers to be configured on site. In other cases, perhaps some modules already exist but some module would need to be developed or adapted to operate as an autonomous machine module. However, this is most likely still faster than developing an entirely new machine.

A Mark Facility Controller manages, coordinates, and represents the entire connected configuration of feeder modules, marker modules, finisher modules and output modules. These are referred to collectively as Machine Modules. There is one Mark Facility Controller for a configuration of machine modules. This collection of machine modules along with a Mark Facility Controller is referred to as a Document Output Terminal or alternatively, a Mark Facility.

The basic concept of the Mark Facility is that jobs coming from various sources such as decomposers, scanners, file systems, etc. can be sent to a common Mark Facility interface independent of where the job is coming from, and independent of what physical machine modules make up the DOT. The Mark Facility Controller is responsible for taking the mark job (described primarily via an Assembly Tree in accordance with the present invention) which is machine independent, mapping it on to the particular machine configuration present, and coordinating the machine modules to render the job.

Note that the Mark Facility Controller is not responsible for the Image Path. However, the Mark Facility Controller interacts closely with an Image Loader. The Image Loader is the demarcation point in the image path after which any further processing can be done in a deterministic amount of time. From the point of view of the Mark Facility Controller, the Image Loader acts as an "image flow control valve", and the Mark Facility Controller coordinates the "feeding of images" through the Image Loader along with and in the same manner as the feeding sheets.

Figure 6:
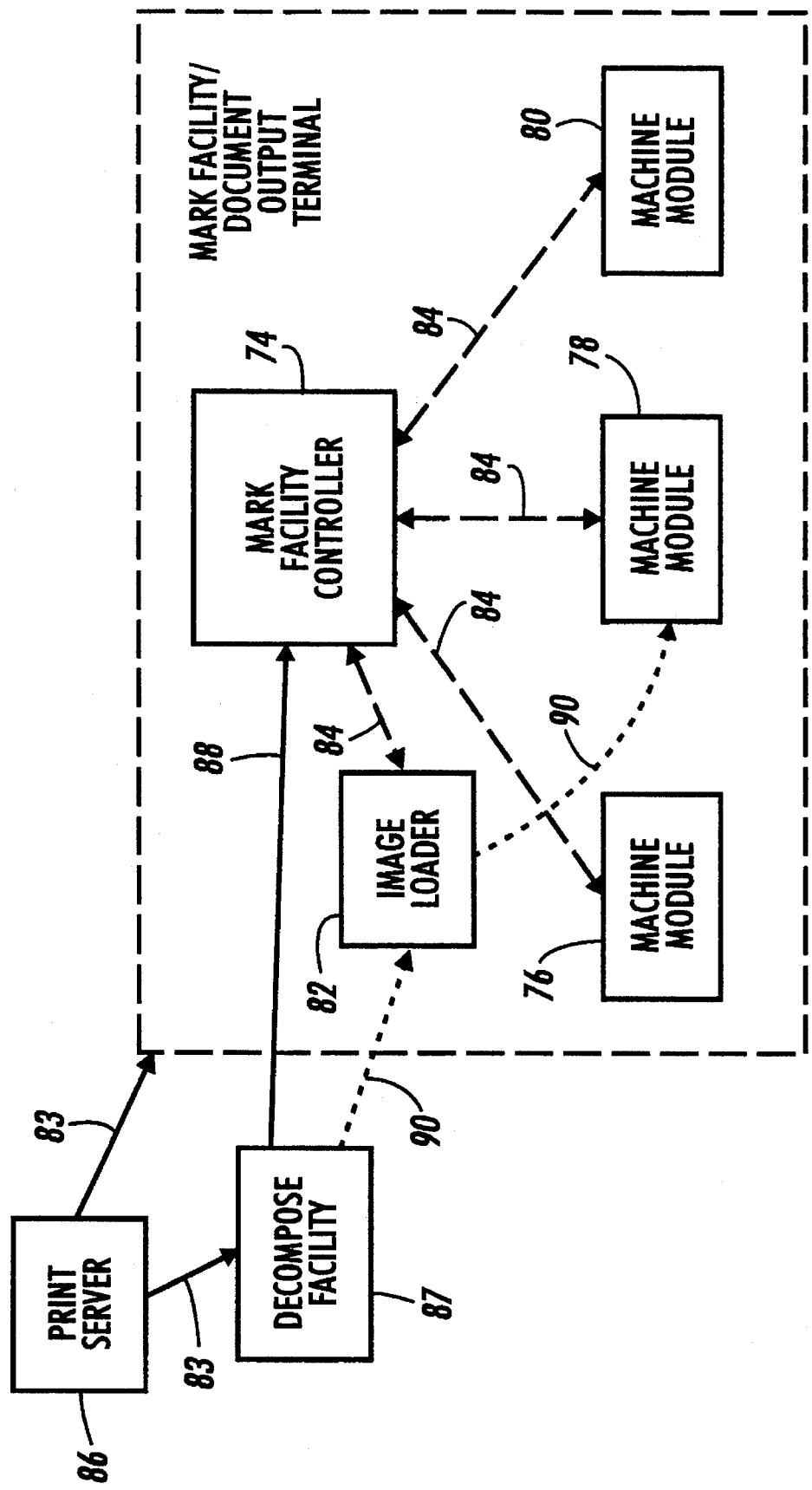
FIG. 6 illustrates a universal controller in accordance with the present invention.

FIG. 6, illustrates how the Mark Facility Controller would interact with the various modules of the Mark Facility as well as the client(s) of the Mark Facility Interface. In particular, there is shown a Mark Facility controller 74 interconnected to arbitrary machine modules 76, 78, and 80 and image loader 82 by means of a page level control path shown as dashed lines at 84. Also shown connected to controller 74 are print server 86 and decompose facility 87 interconnected by means of either a service level control path, 83 or job level control path 88. Also, the image loader 82 can be connected between decompose facility 87 and a marker module, such as 78 by means of a page level image path, dotted lines, 90. Other operations such as a copy service, scan facility, and file system can also be part of the system. The diagram is an example configuration, not the required configuration. The service level control path 83 provides control of the entire Mark Facility (e.g. suspend the facility, resume the facility, submit mark job, cancel mark job, etc). The job level control path 88 would be used for streaming a job description (i.e. assembly tree); page level control 84 is essentially the scheduling of a page.

The Mark Facility Controller meets various requirements. In particular, the Mark Facility Controller ensures that the document output terminal produces what the operator asked for within the constraints of the DOT. If a jam or other anomaly (e.g. crash) occurs during production then recovery must guarantee that no part of the output is lost or duplicated (e.g. can't lose or duplicate printed checks). The Mark Facility Controller ensures that the document output terminal is driven at rated speed whenever resources (paper, images) are available. This requirement implies that the Mark Facility Controller will control whatever buffering functions are necessary to ensure a steady supply of images to the marking module regardless of peculiarities of page order requirements of specific modules. It further implies that the Mark Facility Controller must be capable of streaming mark job (the job description coming into the Mark Facility Controller) to ensure uninterrupted delivery of prints.

In addition, the Mark Facility Controller must support a common Mark Facility Interface (software interface) for all DOTs; all DOTs are controlled through the same software interface, the Mark Facility Interface. The Mark Facility Controller must provide a uniform Machine Module Interface for marking, feeding and finishing for all devices supported by the architecture The Mark Facility Controller must provide information to enable Job Shop Scheduling (a.k.a. work flow management). This includes estimations of "time to complete job". This estimation includes factors like skipped pitches which can be predicted and perhaps those that can be statistically predicted; it does not account for unpredictable skipped pitches (e.g. unexpected jams). The Mark Facility Controller also provides information to its clients to enable load balancing of print jobs across multiple DOTs.

Also, the Mark Facility Controller makes available information about the DOT to Mark Facility clients, including information about the capabilities of the DOT and its current state. The Mark Facility Controller will not have any embedded knowledge about the client(s) of the Mark Facility Interface. That is there must not be any source dependencies incorporated into a Mark Facility Controller implementation. The Mark Facility Controller architecture has no a prior machine module specific knowledge. In particular, even if the Mark Facility Controller is physically packaged with a Marker Module, the Mark Facility Controller implementation software has no a priori knowledge of the marker module; it is completely independent of the marker module. Further, the underlying technology of the Mark Facility Controller should be machine module independent as well. Note that a particular implementation may be "tuned" or even "preset" for a certain set of configurations in order to decrease resource requirements.

The Mark Facility Controller has no knowledge of the image object content, processing requirements and representation. The Image Loader 82 is responsible for performing image processing and the hard real time buffering, synchronization and transmission of data between the Mark Facility Controller and the Marking Module. Information about the production of a mark job (e.g. skipped pitches, number of impressions, etc.) must be available to clients of the Mark Facility. The Mark Facility Controller insulates clients of the Mark Facility from the timing dependencies of the machine modules. Also, the Mark Facility Controller is capable of job streaming—processing a new mark job while the current mark job(s) is being processed. The intent is to remain productive (i.e. do not "cycle down", minimize skip pitches) during the transition from the current job to the next. The Mark Facility Controller is capable of stream printing, that is, of driving marking, feeding, and finishing modules before the entire assembly tree or all source images have been received.

Figure 7:
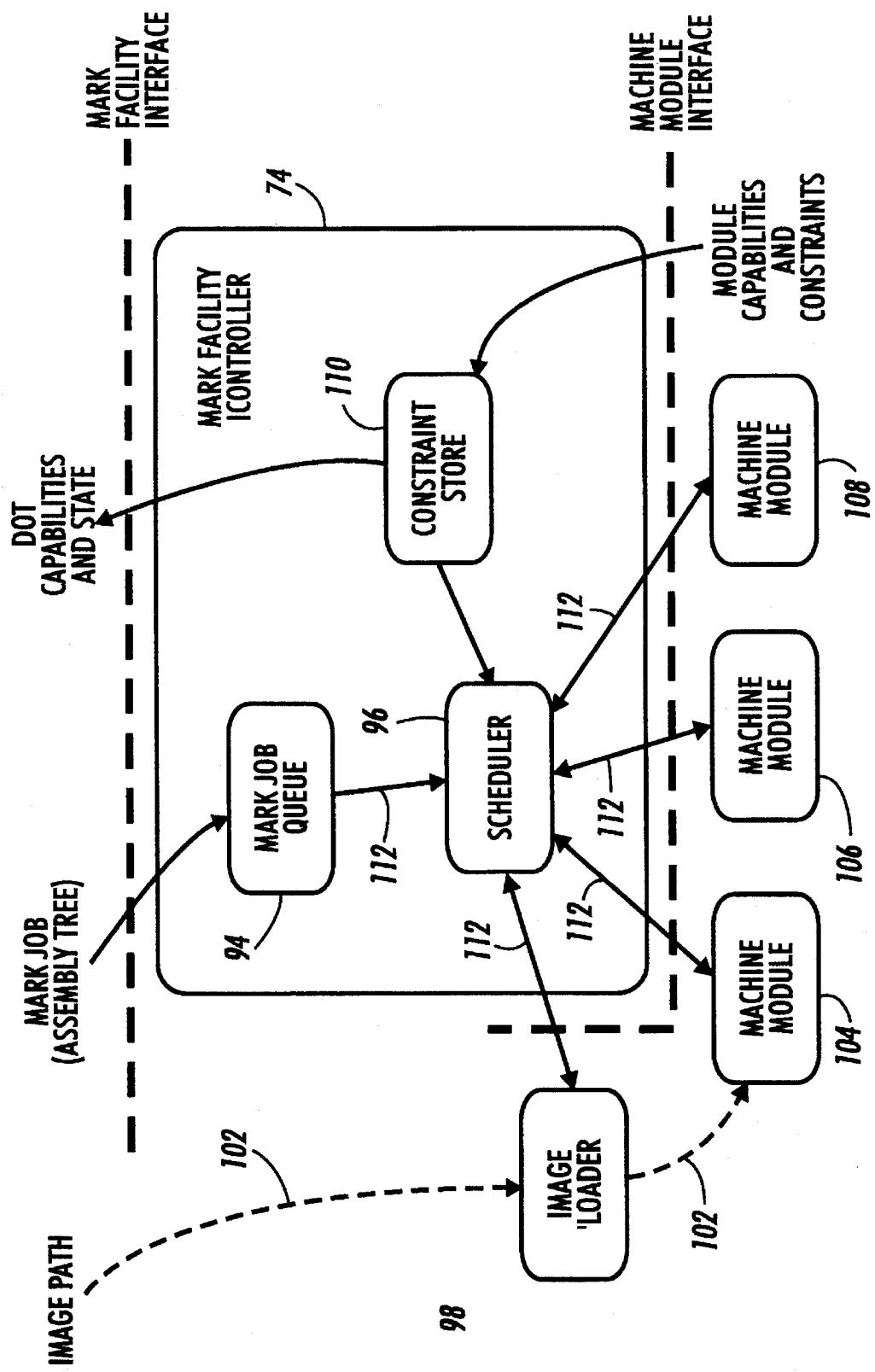
FIG. 7 illustrates a control architecture for the universal controller of FIG. 6 in accordance with the present invention.

FIG. 7 is a high level architectural view of the Mark Facility Controller. The control path is shown in solid arrows 112; the image path is shown in dotted arrows 102. The Mark Facility Controller 74 accepts mark job descriptions from a Mark Facility client such as a Print Service or Copy Service. The main component of this job is the assembly tree, which specifies the physical assembly of the document(s) to be produced. The assembly tree definition is independent of the DOT that will produce the job. The assembly tree references images which are stored outside of the Mark Facility Controller. Jobs are queued in the mark job queue 94, and then go to the scheduler 96 to begin execution.

The scheduler understands and models the machine modules in terms of capabilities and constraints which are uploaded into the Mark Facility Controller at power up time and stored in the constraint store 110. The scheduler 96 coordinates the various machine modules (104, 106, 108, (e.g. feeder modules, image path modules, marker modules, finisher modules, and output modules) to produce the job. The scheduler also coordinates the image loader 98 which is viewed by the scheduler as just another machine module (one that happens to feed images rather than paper). The image loader acts as a "flow control" valve, pulling the images out of the image store and transferring them to a marking module at the scheduled time. Note that there are two fairly independent paths—the control path and the image path. These two paths intersect at the image loader.

The Mark Facility Controller accepts mark jobs and other communication from Mark Facility clients and controls the overall operation of the Machine Modules. There is one and only one Mark Facility Controller per configuration of machine modules; a machine module is controlled by exactly one Mark Facility Controller. A configuration of machine modules can have any combination of modules including multiple mark engines (e.g. a color mark engine and a black/white mark engine both feeding into an envelope stuffer), or no mark engine (just feeders feeding directly into finishers).

A key function of the Mark Facility Controller is to translate the configuration-independent and time-independent mark job specification into configuration-dependent and time-dependent actions for the various machine modules and to coordinate their activities. The Mark Facility Controller sees the machine modules as transducers which input and output work units (sheets, images, and compilations) and have constraints on these inputs and outputs. Thus, mark scheduling involves planning and coordinating a timed sequence of matched inputs and outputs (i.e. transfers) between the various machine modules in the configuration. The Machine Modules are responsible for translating timed sequences of inputs and outputs for their module (e.g. accept a sheet at time 3700 and an image at 4200, and output a print at time 8200) into the electrical and mechanical events necessary to accomplish the transductions to which they commit. Note that while machine modules talk to the Mark Facility Controller in terms of absolute time, this does not imply that machine control inside a module must use absolute time. On the contrary, it is anticipated that some machine modules will translate absolute time to machine clocks and base all their timing off machine clocks as has been done traditionally. There exists a mechanism in the Machine Module Interface to keep absolute clocks in sync across machine modules.

The Mark Job Queue 94 holds jobs until they can be produced. Mark Facility clients can promote and demote jobs in the queue for additional flexibility. The Scheduler 96 takes in jobs represented as assembly trees from the job queue, maps them onto the machine modules present, and finds the optimal sequence of operations to produce the job. Note that for scheduling purposes, the Image Loader 98 is coordinated using the same Machine Module Interface as the machine modules. The scheduler then coordinates the machine modules, monitors their progress, and reacts to problems such as jams and determines the optimal recovery strategy.

The machine modules describe themselves in terms of capabilities and constraints on those capabilities (e.g. can take in sheets and images and put out prints with a maximum throughput of 180 prints per minute). These are uploaded from each machine module into the scheduler where they are combined to form a model of the entire machine. Architecturally, the scheduler requires no prior machine knowledge, and allows for machine modules to upload their capabilities and constraints at power up. However, for a particular product program implementation various optimizations may be made in order to lessen CPU and RAM requirements.

Some mark jobs are not completely provided at the beginning of a job, but rather are streamed in while the job is running. This is called stream printing. The scheduler is responsible for recognizing extensions to the tree as subtree extensions are streamed into it, and pruning the tree as the machine modules indicate that various nodes of the assembly tree have been successfully delivered. There may need to be some kind of bidding functionality. For example, a print shop scheduler (a different scheduler, at a much higher level) might query the Mark Facility Controller as to its ability to render a particular mark job. To validate the job without actually printing it, the bidding function would examine the machine graph (the description of the print machine configuration), validate that it could (or could not) do the job, and if so, submit a estimate of how long it would take, how soon it could start, etc. This would allow the print shop scheduler to perform load balancing or job pre-validation to improve shop productivity. Note that when estimating the time to produce a mark job, the Mark Facility Controller cannot take into account unforeseen circumstances like unexpected paper jams, etc.

While the Image Path is not part of the Mark Facility Controller, the Mark Facility Controller makes assumptions about its operation. The Mark Facility Controller treats images as work units to be scheduled (the same as sheets and compilations). The Mark Facility Controller expects modules sourcing images as work units to operate as proper Machine Modules and thus export the Machine Module Interface. Functions such as image buffer control, image processing, and consumption/generation of image formats are outside the scope of the Mark Facility Controller.

The Mark Facility Controller also needs to support offline finishing. There are two classifications of offline finishing: 1) completely independent standalone finishers and 2) configurations of feeders and/or finishers. A Mark Facility Controller is not needed in (1), but may be needed in (2). Therefore the Mark Facility Controller must be able to run on a platform suitable to this situation. For example, it may be desirable to have the Mark Facility Controller run on a laptop which can be connected to a configuration of feeders and finishers and coordinate them.

Figure 8:
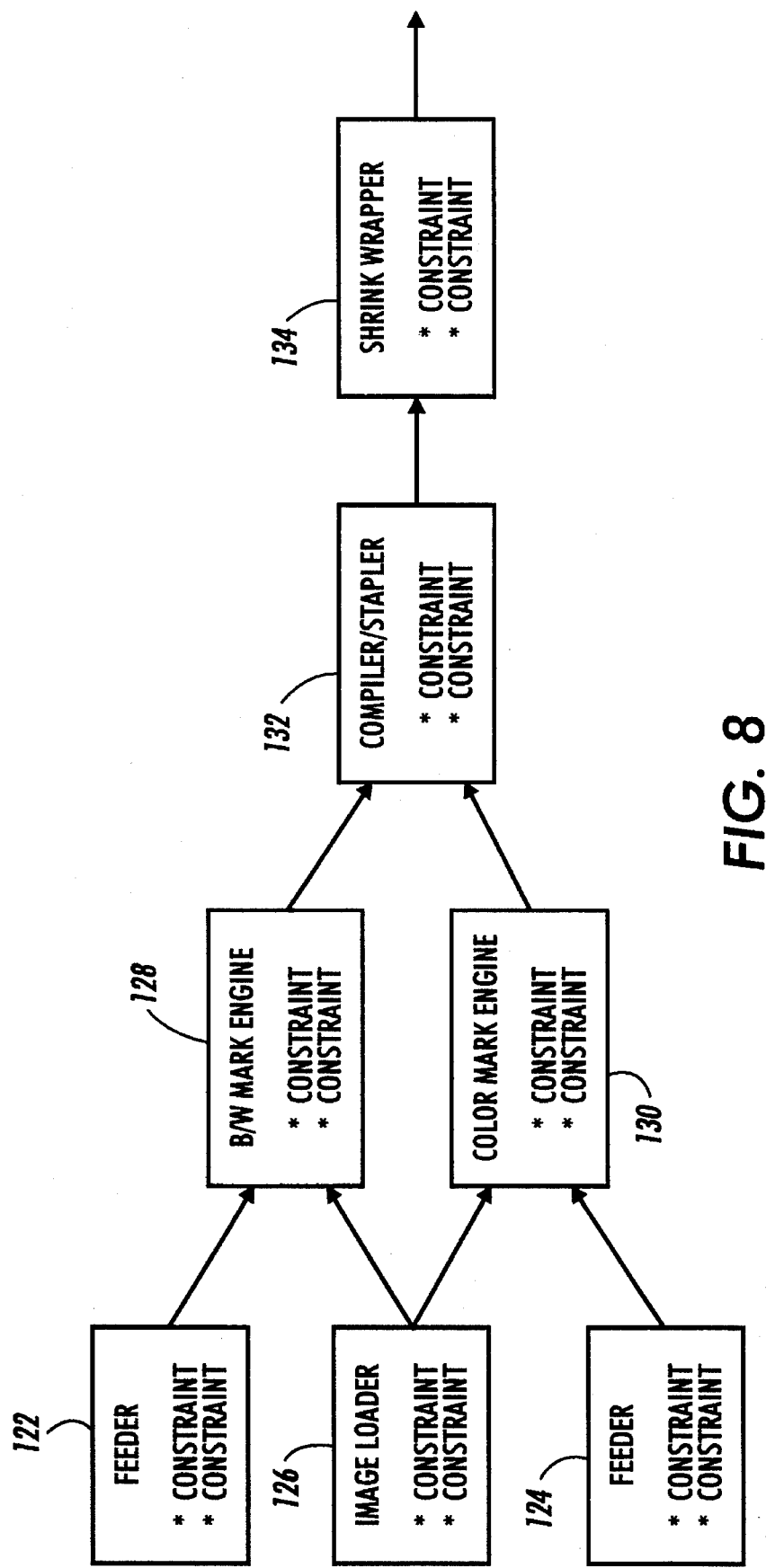
FIGS. 8 and 9 illustrate machine representations as transducers with constraints in accordance with the present invention.
Figure 9:
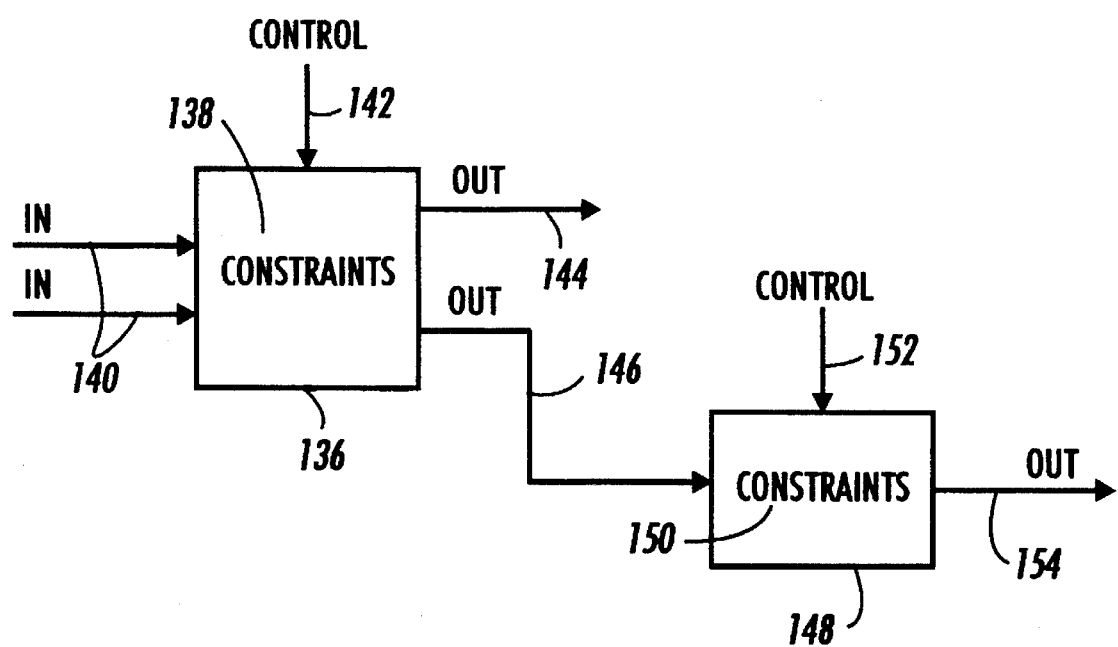

A system of machine modules is modeled as a collection of transducers which have constraints, as shown in FIGS. 8 and 9, that specify their behavior. Scheduling is accomplished by finding a sequence of transfers between the various transducer inputs and outputs that is consistent with the constraints. This is the essence that enables mix-and-match of Markers, Feeders, and Finishers. In particular, machine modules such as feeders, mark engines, and finishers are viewed as black boxes with portals which allow transfer units such as sheets, sets, plates, etc to enter or exit. Modules also have conceptual control signals which is used to specify desired capabilities such as simplex verses duplex, or staple verses bind. Modules export portals and control signals to the scheduler along with constraints. The constraints identify the subspace of signals that can be exhibited by the black-box on its portals. Every solution of the constraints corresponds to a feasible behavior of the black-box and every feasible behavior of the black-box corresponds to a solution of the constraints.

The scheduler creates a graph representing all of the modules. For example, feeders 122, 124, and image loader 126 with specific constraints are connected to either or both of black and white mark engine 128 and color mark engine 130 as illustrated in FIG. 8. Each of the mark engines includes specific constraints relative to a connection to complier/stapler 132 in turn connected to shrink wrapper 134 with associated constraints. Depending upon the interconnection and constraints, certain operations are acceptable and certain operations would fail. This interrelation can be illustrated by interconnected transducers illustrated in FIG. 9. For example, transducer 136 is connected to transducer 148, transducer 136 responding to constraints 138, inputs 140 and control 142 to provide outputs 144 and 146. Output 146 is an input to transducer 148 in turn providing output 154 in response to control 152 and constraint 150.

When a print job is submitted, the scheduler creates a plan by solving the constraints and specifying the identity and times of transfer along the edges of a graph representation of module (the boundaries of the transducers). The machine module descriptions that the scheduler accepts are compositional, i.e. feeder, mark engine, and finisher descriptions can be merged at power-up time to form a single print machine description which can then be scheduled.

Capabilities are a means of describing what a DOT machine module can do such as feed paper, simple mark, staple, etc. Capabilities are described in terms of work units input, work units output, and the relationship between the inputs and the outputs using universally defined keywords. Traditional means of defining what a machine module can do have limited their description to the end outcome (stapled, bound, etc) which is insufficiently detailed to allow mix-and-match of markers, feeders, and finishers.

A capability is expressed on a transducer such as a machine, a machine module, or a component within a machine module. The capabilities defined what the transducer does. The capability identifies which kind of work unit is entering or exiting on which port of the transducer. It defines any constraints on timing of the work units (e.g. minimum 500 milliseconds between entering sheets), or attributes of the work units (e.g. paper size must be less than 17"), etc. It also defines the relationship between the inputs and outputs in terms of work unit properties e.g. finishing changed, added, deleted, etc., e.g. the sheet exiting has all the same properties as the sheet entering, except the orientation is changed from face up to face down).

The advantages over traditional methods of describing such data include the following. Traditionally, it was simply stated that a machine module with a stapler, merely stapled, and referred to the DPA ISO 10175 keyword STAPLE. However, actual machines differ widely in the physical details of accomplishing this operation. Therefore, by simply saying STAPLE does not provide enough information to determine whether a collection of machine modules can actually produce the requested job. For example, one machine might receive the set face up, stapled and release the set face down. Another machine might do the same but release face up, another might not take sets in, but take sheets in, etc. Trying to describe all the different permutations using DPA-styled keywords quickly leads to an explosion of the number of keywords which quickly becomes unmanageable. Breaking the description into inputs, outputs, and the relationship between the inputs and outputs breaks the problem of describing what the machine does into smaller pieces which turn out to be easily manageable.

A Machine Graph, a directed graph data structure, as shown in FIG. 9, is a means of representing a configuration of DOT feeders, markers, and finisher modules. Traditionally, DOT machines were represented only as the sum of their functionality (so many feeders options, so much marking throughput, and so many finishing options) and have never attempted to represent topology. The nodes of the graph represent the machine module; the directed edge represented the paper/set/etc flow between machine modules. Nodes may have multiple ins and outs. By representing the machine as a graph, arbitrary configurations of machine modules can be expressed including modules with merges, forks, parallel paths, etc. Also, the marker-centric paradigm is no longer required—configurations can be expressed which have multiple markers or no markers.

In scheduling Document Output Terminals, committing to some capabilities such as marking the front side of a page are interdependent on committing to other capabilities such as marking the back side of the page as well. In the past such interdependencies were handled on an ad hoc basis. However, ad hoc methods generally don't support mix-and-match of arbitrary modules. A generalized concept called the commitment group, any collection of interdependent capability commitments is required. A commitment group is committed if and only if each capability commitment within the group is committed.

When any machine configuration is created, the Mark Facility Controller uploads the capabilities and constraints of each of the machine modules and examines the constraints to uncover interdependencies. When a job is submitted and the Mark Facility Controller is coordinating its execution, the Mark Facility Controller identifies the commitment groups by referring to these interdependencies as it prepares to propose the capabilities to produce the job. Commitment Groups provide a generalized scheme for dealing with interdependencies, thus enabling mix-and-match of modules. For further details, reference is made to pending applications U.S. Ser. Nos. 563,317, 563,873, 565, 189 and 563,817 incorporated herein.

In accordance with the present invention, there is provided an assembly tree to represent a document or job requirement. An assembly tree is a machine-independent representation of the structure of the physical document. An assembly tree is used to specify a document that is to be printed by a print engine. Traditionally machine-independent tree structures have been used at the Page Description Language level (e.g. Postscript, SPDL), but the assembly tree is different in that it establishes a machine-independent tree structure at the post-decomposition stage. Such a description is necessary to enable mix-and-match of document output terminals (DOT's).

The assembly tree model is an extension of a model used in desktop publishing. Desktop publishing systems often organize data as trees. For example, text is made up of characters which make words, which in turn form sentences and paragraphs. Further, desktop publishing systems often distinguish between the text tree which describes just the text, and the format tree which describes formats like font and line heights. To fully describe a document, the text is "poured" into the format tree.

Extending this concept, an assembly tree is defined which describes the production or assembly of the report. The separation of text, format, and assembly is very helpful because from the point of view of a print engine, text and format and other logical content can be entirely ignored. Further, tree definitions are inherently recursive, which leads to a description which is naturally extendible.

Figure 10:
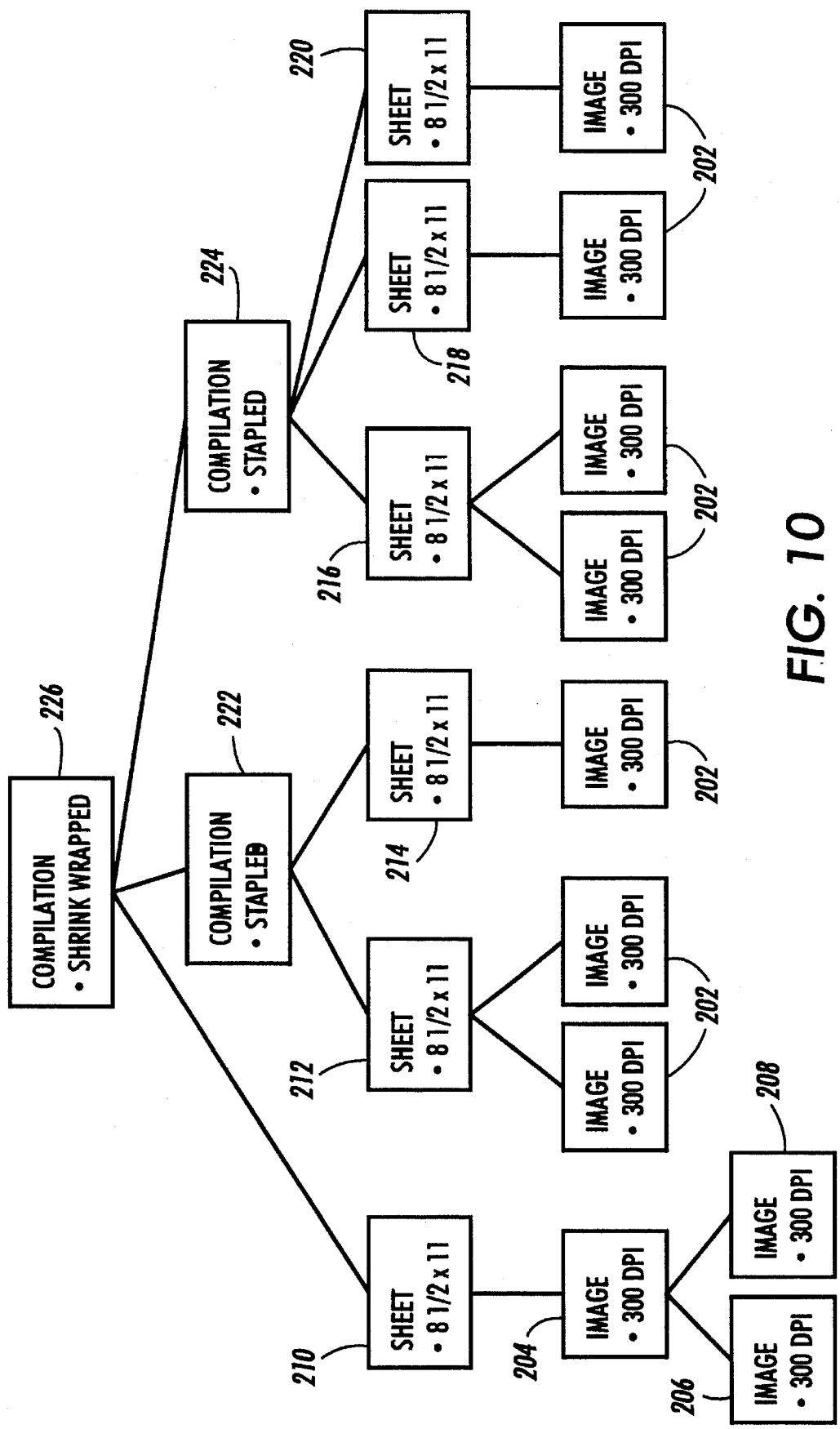
FIG. 10 illustrates a typical assembly tree configuration of a job requirement in accordance with the present invention.

With reference to FIG. 10, there is illustrated an assembly tree structure to define a typical document. A typical document is generally a set of copy sheets made up of multiple images. For example, various images as illustrated at 202 are combined to provide sheets 212, 214, 216, 218, and 220. It should be understood that any of the images 202 can be the product of several sub-images, For example, image 204 is shown as being a combination of sub-images 206 and 208. As will also be understood, a sheet can be any combination of images and sub-images. For example, sheets 212 and 216 are illustrated, each as a combination of two images. It should be understood that a sheet is generally comprised of a plurality of images and sub-images.

A compilation is a combination of multiple sheets. For example, copulation 222 is a combination of sheets 212 and 214 and compilation 224 is a combination of sheets 216, 218, and 220. As shown, the compilations 222 and 224 are for the purpose of stapling sheets. A compilation can also be a combination of sheets and other compilations. For example, compilation 226, for a shrink wrap operation, is a compilation of sheet 210, compilation 222 and compilation 224. As illustrated, the assembly tree nodes comprise images, sheets, and compilations.

Compilations may have any number of groupings or off-spring. Sheets may have front and/or back images. Images may have sub-images, recursively. All nodes may have properties such as size or weight. All nodes may have finishing specifications such as staple or trim. All properties and finishing identifiers are expressed through universally registered keywords. Note that while the tree is "post-decomposition" (the images are print ready), the tree is still machine independent. That is, the tree makes no statements concerning how the documents are to be produced (timing, production order, etc), only statements relating to the final output. The advantages over traditional methods of describing such data are that the assembly tree is highly expressive, machine interpendent, and extendible. The tree structure can express any kind of print engine job. This is a significant improvement over traditional specifications which often had to be altered whenever a product program needed to add a new job type. The assembly tree specification is independent of any particular machine, its configurations, and of it temporal constraints. This means the decomposer/print engine protocol doesn't have to change whenever the print engine changes. Because properties and finishing are expressed through keywords, new keywords can be added at any time, extending the space of expressible trees (traditionally, these have been hard-coded) The effect of the above is that the assembly tree enables true ESS/Print Engine plug-and-play.

In accordance with the present invention, an assembly tree is used for describing a universal canonical representation of a physical document. Because it is purely descriptive, an assembly tree can be used to describe a document that was scanned, a document that is to printed on a print engine, as well a document in intermediate steps between capture and mark. Traditionally different formats have been used at each stage because no format was expressive enough to cover all areas. Because the assembly tree simply describes a physical document rather than prescribing various actions to be taken, the assembly tree can be used in many interpretations. For example, when sent to a print engine, it can indicate a document to be printed. When received from a scanner, it can indicate a document that was scanned.

The genesis of an assembly tree is any input stream that a machine can accept. The input stream may be a PDL stream, an incoming Fax, or a stream of scanned images—each of these streams may be accompanied by some amount of 'job level' information. A Mark Facility and display are examples of consumers of assembly trees. Merge is an example of a component that consumes assembly trees and produces new assembly trees based on the input trees. The advantages over traditional methods of describing such data include having a common data format and a single canonical form representing documents. Having a single canonical form greatly simplifies system software, eliminating the needs for features such as conversations. Also, establishing a single canonical form for representing physical documents at the post-decomposed/image as bits creates new opportunities for "plug-in components". For example, a 3rd party vendor might make a "9-up" plug-in component that consumed assembly trees, and produced new assembly trees that were 9-up versions of the input assembly trees.

Figure 11:
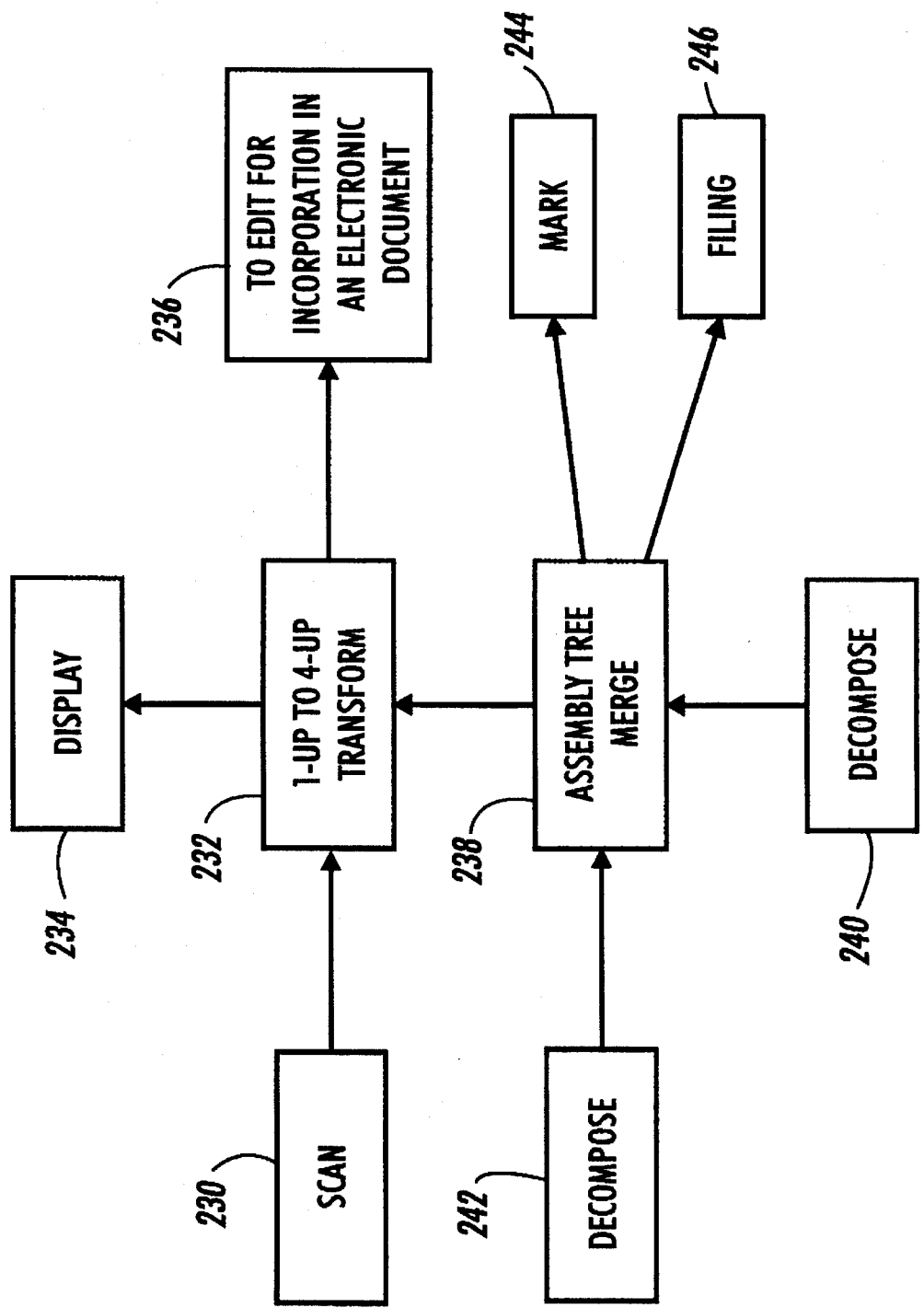
FIG. 11 illustrates the merging and transferring of assembly trees between facilities in accordance with the present invention.

With reference to FIG. 11 there is shown an example of the transfer of assembly tree representations between facilities. For example, block 230 illustrates the scanning of a document and conversion into the assembly tree format. At block 232, the scan document is transformed from a 1-up to a 4-up document by suitable manipulation of the assembly tree. The document or image in the assembly tree format can then be displayed as illustrated at block 234, sent for editing for incorporation into another electronic document as shown at 236 or merged with other assembly trees as illustrated at 238. Block 238 is also shown as receiving decomposed images in assembly tree format at 242 and 240 to also be merged at block 238. The merged assembly tree can then be forwarded to a mark facility shown at 244 or filed as illustrated at 246.

In accordance with the present invention, there is provided a generic means, a production tree, to represent how a mark job is to be produced by a particular Document Output Terminal (DOT), a collection of markers, feeders, and finishers. The product tree structure is generic and can be used for any mark job on any DOT. Traditionally, such information was kept in ad hoc data structures customized to a particular DOT.

A production tree is a tree structure where the nodes represent capabilities of a DOT and the edges represent transfer of work units (images, sheets, and compilations) between various components of the DOT. The structure of the production tree establishes which capabilities of which machine module will be used to produce which part of the job; the timings on the edges establishes when capabilities are be to executed and in what order. A production tree is generally built by taking an input mark job in the form of an assembly tree discussed above, along with a model of the DOT expressed in terms of components with capabilities and mapping the assembly tree onto the model's capabilities.

Traditional methods of representing a document production plan generally have no means of accommodating a mix-and-match of various 3rd party markers, feeders, and finishers. The production tree enables this mix and match because of its generic means of relying on capabilities. The production tree is a central data structure in the Mark Facility architecture. Having a single representation across products allows for significant reuse among software that interacts with the production tree, in particular, a constraint-based scheduler.

Figure 12:
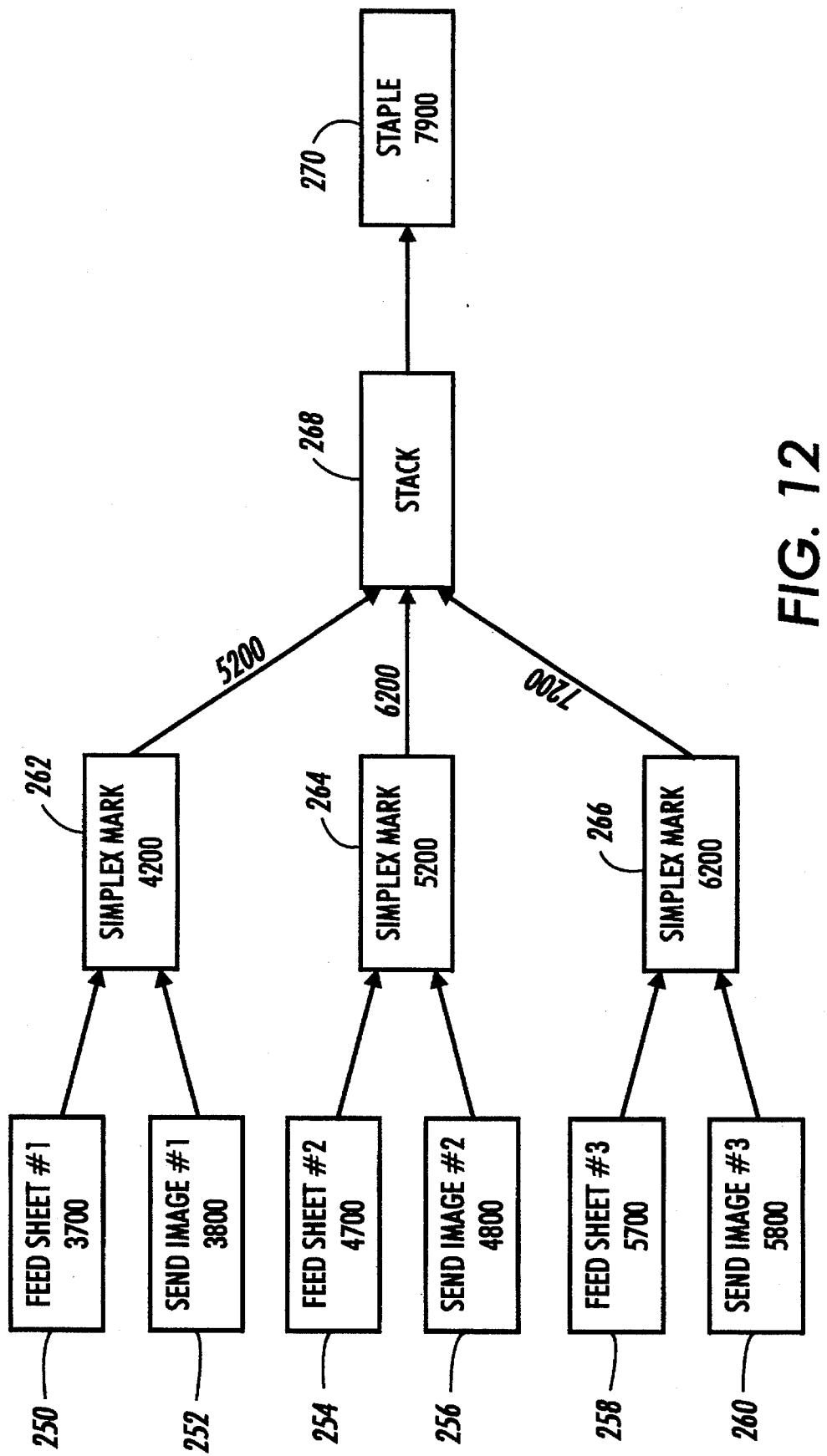
FIG. 12 illustrates a typical production tree with constraints converted from an assembly tree to drive a printing apparatus in accordance with the present invention.

FIG. 12 illustrates a typical production tree to represent the manner of accomplishing a mark job requirement. Assume an assembly tree represents sheet 1 to receive image 1, sheet 2 to receive image 2, and sheet to receive image 3, the sheets 1, 2, and 3 to be compiled and stapled. A production tree representation of this generic assembly tree to achieve the result is illustrated. Specifically, FIG. 12 illustrates the flow of the work units or images, sheets, and compilations are organized with appropriate timing indications to achieve the results. Block 250 illustrates sheet 1 feed at 3700 milliseconds and then image number 1 generated at 3800 milliseconds for marking at the appropriate marking machine at 4200 milliseconds as shown at block 262.

In a similar manner, sheet number 2 is fed at 4700 milliseconds and image number 2 generated at 4800 milliseconds for marking sheet number 2 at 5200 milliseconds as shown at block 264 and sheet number 3 fed at 5700 milliseconds with image number 3 generated at 5800 milliseconds for marking the sheet number 3 at 6200 milliseconds shown at block 266. A stack operation or compiler shown at block 268 receives sheet 1 at 5200 milliseconds, sheet number 2 at 6200 milliseconds and sheet number 3 at 7200 milliseconds. Finally, a staple operation is illustrated at block 270 at 7900 milliseconds.

In general jobs are submitted to a DOT in terms of assembly trees which specify only what must be produced, not how to produce it. However, sometimes operators need more control over the manner in which the job is to be produced (e.g. only use paper in tray 5, use stapler A, not stapler B, etc). Because a production tree represents a plan of exactly how a mark job is to be produced by a particular DOT as discussed above, a partial production tree can be used as a generic means to specify parts of the job which the operator wants to specify. Previously, there has been no generic means to accomplish this type of job designation.

In accordance with the present invention, when a mark job is submitted, in addition to the assembly tree, the submitter may optionally include an untimed production tree (i.e. a production without timing defined on its edges). The included production tree describes exactly how only certain portions of the job are to be accomplished. Typically the production tree is a partial production tree, but it may be a complete production tree (in that case, the submitter has identified exactly how every aspect of production is to be carried out). The Mark Facility uses the submitter's production tree as a constraint in building its complete production tree—capabilities in the complete production tree must match the capabilities specified in the submitters production tree. If the submitted production tree was partial, unspecified parts may be achieved using whatever capabilities the Mark Facility chooses.

How to specify machine-dependent actions in producing a job has traditionally been ad hoc and machine-dependent. Such means can not support mix-and-match of various markers, feeders, and finishers. Using the Production Tree to specify machine dependent actions is based on the generic concept of capabilities and components, and supports mix-and-match.

Traditionally, all DOTs have been monolithic, and therefore a diagnostic procedure simply asked the DOT to do a particular action such as feed 10 sheets and take timing measurement along the paper path. However, in a mix-and-match context, a mark engine's paper path and the feeders which supply paper may be in different mix-and-match machine modules which could be configured in any arbitrary configuration. Therefore, a mark engine paper path diagnostic cannot know when sheets should be feed, and similarly, neither can the mark engine. However, in accordance with the present invention, by supplying a partial production tree to the Mark Facility which specifies what paper is needed and when, the Mark Facility can determine when various feeders in other machine modules need to feed in order to satisfy the need of the diagnostic routine.

That is, in order to execute a diagnostic routine on a machine module which requires cooperation from other machine modules, a diagnostic service submits an untimed partial production tree to the Mark Facility. The Mark Facility then coordinates the other machine modules in order to meet the requirements expressed in the production trees. Previously, there was no means to achieve diagnostics requiring multiple machine module cooperation in a mix-and-match context. How to specify diagnostic actions has also traditionally been ad hoc and machine dependent. Such means, likewise, do not support mix-and-match markers, feeders, and finishers. Using the Production Tree to specify such actions in other machine modules is also based on the generic concept of capabilities and components and provides more versatile and selective diagnostics.

While this invention has been described in conjunction with a specific apparatus, it is evident that many alternatives, modifications, and variations will be apparent to those skilled in the art. Accordingly, it is intended to embrace all such alternatives, modifications, and variations as fall within the spirit and broad scope of the appended claims.

I claim:

1. In an electronic image processing apparatus comprising a controller and a plurality of modules, each of the modules including an associated processor, each of the processors storing data related to operational capabilities of the associated module, a method of operating the image processing apparatus in response to a job requirement comprising the steps of:

converting the job requirement into an assembly tree, the assembly tree being a relationship of images, copy sheets, and compilations of copy sheets representing the job requirement, receiving from each of the processors the data related to the operational capabilities of each associated module, interrogating each of the processors to determine the interconnection of each of the modules to other modules, responding to the data related to the operational capabilities of each of the modules, the interconnection of the modules, and to the the assembly tree relationship of images, copy sheets, and compilations of copy sheets representing the job requirement for providing a production tree relationship of the operational capabilities of the modules including timing relationships for operating the image processing apparatus.

2. The method of claim 1 including the step of representing the image processing apparatus as a graph, each module being represented by a node on the graph.

3. The method of claim 2 wherein the representation of the image processing apparatus as a graph enables the configuration of the controller to operate in accordance with the given job requirement.

4. In an electronic image processing apparatus comprising a controller and a plurality of modules, each of the modules including an associated processor, each of the processors storing data related to operational capabilities of the associated module, a method of scheduling the image processing apparatus to complete a given job requirement comprising the steps of:

receiving a job requirement from a job source, defining the job requirement in an assembly tree format incorporating images and compilations of sheets, interrogating each of the processors to determine the interconnection of each of the modules to other modules, evaluating the interconnection of the modules and the data related to the operational capabilities of the associated modules, determining that the given interconnection of the modules is capable of completing the job requirement, and responding to the data related to the operational capabilities of each of the modules, the interconnection of the modules, and to the the assembly tree relationship of images and compilations of copy sheets representing the job requirement for providing a time and capability dependent relationship of modules to complete the job requirement.

5. The method of claim 4 wherein the images include sub-images and the compilations of sheets include compilations of compilations of sheets.

6. The method of claim 5 including the step of mapping the assembly tree onto the capabilities of the modules.

7. The method of claim 4 including the step of representing the image processing apparatus as a graph, each module being represented by a node on the graph.

8. In an electronic image processing apparatus comprising a controller and a plurality of resources, the resources being in an arbitrary configuration, each of the resources including an associated processor, each of the processors storing data related to operational constraints of the associated resource, a bus for interconnecting the processors to the controller for directing the operation of the resources, a method of operating the resources to produce a job requirement comprising the steps of:

interrogating the processors to determine the interconnection of each of the resources and the operational constraints of each of the resources, defining the job requirement in an assembly tree format for processing by the electronic image processing apparatus, providing said assembly tree format to the controller for processing, analyzing the job requirement in relationship to the constraints and interconnection of the resources, and mapping the job requirement onto the resources.

9. The method of claim 8 including the steps of formulating the job requirement as a plurality of images, some of the images being combinations of other images, defining a set of sheets, each sheet including one or more of said plurality of images, and specifying compilations of sheets, each compilation being a compilation of sheets or a compilation of compilations of sheets.

10. In an electronic image processing apparatus comprising a controller and a plurality of resources, the resources being in an arbitrary configuration, each of the resources including an associated processor, each of the processors storing data related to operational constraints of the associated resource, a bus for interconnecting the processors to the controller for directing the operation of the resources, a method of operating the resources to produce a job requirement comprising the steps of:

interrogating the processors to determine the interconnection of each of the resources and the operational constraints of each of the resources, defining the job requirement in an assembly tree format for processing by the electronic image processing apparatus including the steps of formulating the job requirement as a plurality of images, some of the images being combinations of other images, defining a set of sheets, each sheet including one or more of said plurality of images, and specifying compilations of sheets, providing said assembly tree format to the controller for processing, analyzing the job requirement in relationship to the constraints and interconnection of the resources, and completing the job requirement responsive to the constraints and interconnection of the resources.

11. The method of claim 10 wherein the step of completing the job requirement responsive to the constraints and interconnection of the resources includes the step of mapping the job requirement onto the resources.

12. The method of claim 10 including the step of representing the interconnection of the machine modules in graphical form to enable the dynamic configuration of the controller.

13. The method of claim 10 wherein the step of analyzing the job requirement in relationship to the constraints and interconnection of the resources includes the step of analyzing the job requirement in relationship to the graphical form of the resources.

14. The method of claim 10 wherein the resources include decomposers, scanners, and file systems.

15. The method of claim 10 wherein the resources include a plurality of image marking devices.

16. The method of claim 10 wherein the resources exclude image marking devices.

17. The method of claim 10 wherein the resources include a plurality of sheet feeders, a plurality of image marking devices, and a plurality of finisher devices.

18. In an electronic image processing apparatus comprising a controller and a plurality of machine modules, the controller interconnected to a plurality of job sources for receiving a job requirement, each of the modules including an associated processor electrically connected to the controller, each of the processors storing data related to operational capabilities of the associated module, a method of operation of the controller of the image processing apparatus comprising the steps of:

receiving from one of the job sources a job requirement, the job requirement being unrelated to the machine modules, interrogating the machine modules to determine the interconnection of each of the machine modules, determining the capabilities of each of the modules, analyzing the job requirement in relationship to the capabilities of the machine modules, defining the job requirement in an assembly tree format for processing by the electronic image processing apparatus, mapping the job requirement in a production tree format onto the machine modules, and coordinating the machine modules to complete the job requirement.

19. The method of claim 18 wherein the modules include a plurality of image marking devices.

20. In an electronic image processing apparatus comprising a controller and a plurality of machine modules, each of the modules including an associated processor electrically connected to the controller, the controller interconnected to a plurality of job sources for receiving a job requirement, each of the processors storing data related to operational capabilities of the associated module, a method of operation of the controller of the image processing apparatus comprising the steps of:

receiving a job requirement from a job source, the job requirement being unrelated to the machine modules, interrogating the machine modules to determine the interconnection of each of the machine modules, determining the capabilities of each of the modules, defining the job requirement in a first format independent of the capabilities of the modules, analyzing the job requirement in relationship to the capabilities of the machine modules, converting the job requirement into a second format dependent upon the capabilities of the machine modules, and coordinating the machine modules to complete the job requirement.

21. In an electronic image processing apparatus comprising a controller and a plurality of machine modules, each of the modules including an associated processor electrically connected to the controller, each of the processors storing data related to operational capabilities of the associated module, a method of operation of the controller of the image processing apparatus comprising the steps of:

receiving a job requirement, interrogating the machine modules to determine the capabilities of each of the modules, defining the job requirement in a first format independent of the capabilities of the modules, analyzing the job requirement in relationship to the capabilities of the machine modules, converting the job requirement into a second format dependent upon the capabilities of the machine modules, and coordinating the machine modules to complete the job requirement.

* * * * *